Aug. 15, 1939.  K. RABE  2,169,850

SPRING MECHANISM

Filed Jan. 21, 1936

Karl Rabe
Inventor
By A. A. Wickel
Attorney

Patented Aug. 15, 1939

2,169,850

UNITED STATES PATENT OFFICE 2,169,850

SPRING MECHANISM

Karl Rabe, Stuttgart, Germany, assignor to Dr. ing. h. c. F. Porsche, K.-G., Stuttgart-Zuffenhausen, Germany, a company of Germany Application January 21, 1936, Serial No. 60,049
In Germany January 26, 1935

5 Claims. (Cl. 267—57)

The present invention relates to improvements in spring mechanism and particularly to spring mechanism for vehicles.

An object of the present invention is to improve the construction of torsional springing means for a vehicle or the like.

Another object is to provide a combined torsion spring mechanism and shock absorber.

Another object is to provide a springing arrangement for vehicles in which the torsion member forms a part of the shock absorber.

Another object is to provide such a construction in which the torsion bar is utilized to apply friction producing pressure to the shock absorbing mechanism.

Another object is to provide a torsion bar spring mechanism in which the torsion bar serves to carry the spring reaction transmitting means and in which means are provided to prevent disconnection in the event of breakage of the torsion bar.

A further object is to provide such a device in which the disconnection preventing means comprises the shock absorber.

These and other objects and purposes of this invention are illustrated by way of example in the attached drawing showing one embodiment thereof, in which drawing.

In said drawing, the numeral 2 represents a spring reaction transmitting member which may be in the form of a crank arm which directly carries the stub axle of one of the road wheels or which may form a part of any other type of road wheel support or which through links, levers, or the like, serves to transmit the spring reaction to a road wheel for the purpose of resiliently supporting the road wheel relative to the vehicle.

The numeral 3 indicates a hub fixedly connected with the arm 2 and also fixedly but adjustably connected to the torsion member 5 preferably through a splined connection as shown at 4.

Figure 3:
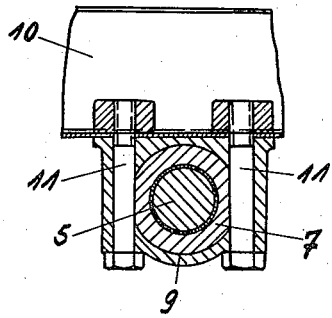
Fig. 3 shows a cross section on the line III—III of Fig. 1.

As shown, the torsion member is supported in sleeves 6 and 7 firmly connected to frame members 8 and 10, respectively. The member 7 is preferably attached to the frame member 10 by the means shown in Figs. 1 and 3, including the bracket 9. As shown in Fig. 3, the bracket 9 may be attached to the frame member 10 by means of bolts 11 which may simultaneously serve to hold the bearing sleeve 7 against rotation.

The opposite end of the torsion bar member 5 may be fixed against rotation relative to the frame by and suitable means, one such means being described hereinafter. It will be readily understood that when in operation a wheel strikes an obstruction on the road surface, the arm 2 will be rocked, carrying with it the splined end 4 of the torsion member which will thus be given oscillatory movement relative to the frame member 10, which movement is made possible by oscillation of the outer end of the torsion bar within the bearing sleeve 7.

In order to provide for dampening of these oscillations I prefer to provide a so-called shock absorber operating between the oscillating parts and the frame to impose frictional resistance to oscillations of the arm 2. This can be conveniently and effectively accomplished by the means shown, wherein the bracket member 9 is provided with a flange 18 between which and the flange 19, fixedly connected to the arm 2 and hub 3, are located a plurality of friction plates as 13 and 14 connected together by means of U-shaped spring members 16 and 17 which may be conveniently formed integral with the plates 13 and 14 respectively. Friction discs 15 may be placed between the plates 13 and 14. The outer plate 14 is preferably firmly attached, as by welding, to the flange 18 while the outer plate 13 is attached to the flange 19. Thus these parts serve not only as vibration dampening means but also to hold the arm 2 against transverse disconnection in the event of breakage of the torsion member 5. In order to provide the desired pressure between the friction plates and discs, suitable means for tensioning the torsion member 5 are preferably used. This means may consist of the coil spring 29 and the nut 30 screw threaded upon the end 28 of the torsion member. It will be readily seen that by adjusting the nut 30, the amount of pressure on the friction plates may be adjusted.

Figure 1:
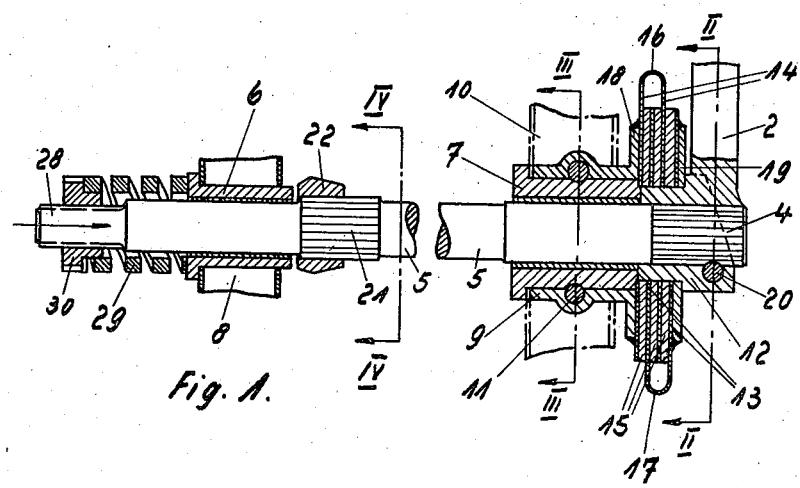
Fig. 1 shows a fragmentary view, partly in section, of a vehicle spring mechanism illustrating the invention.
Figure 4:
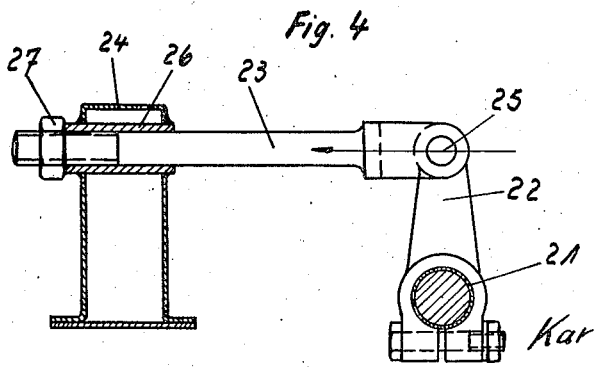
Fig. 4 shows a cross section on the line IV—IV of Fig. 1.

While any suitable means may be employed to prevent rotation of the torsion member relative to the frame member 8, the form shown at the left of Fig. 1 and in Fig. 4 is very satisfactory. The construction shown consists of an arm 22 adjustably connected to the torsion member ber 5 as by clamping it upon the spline 21 thereof. The arm 22 is shown as having pivotally attached thereto at 25 a rod 23 passing through a sleeve 26 in a part 24 of the frame. Nut 27 provides an adjustable abutment for the holding means.

Figure 2:
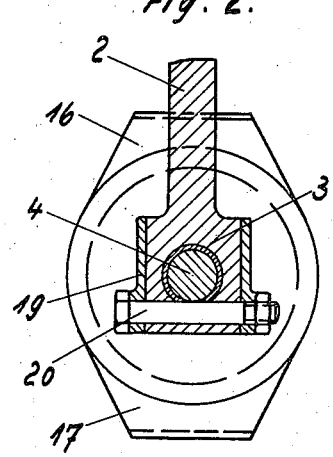
Fig. 2 shows a cross section on the line II—II of Fig. 1.

As shown in Fig. 2, the arm 2 and hub 3 may be clamped upon the spline 4 of the torsion member 5 as by bolt 20 which may at the same time serve to hold the friction plate 19 in place.

The term "frame" as herein used is not to be understood as limited to such device when formed separate from the body or coach work of the vehicle but as including such device when forming a part of or intimately interconnected with the body or coach work of the vehicle.

It will be seen that the illustrative embodiment described above serves eminently to accomplish the objects stated above but it is to be understood that the embodiment shown and described is intended merely as illustrative and not as limiting.

What is claimed is:

1. In a vehicle having a frame, a wheel, and wheel supporting means pivotally connected to said frame, the combination of shock absorbing means including a pair of interpolated spring members connected respectively to said frame and said wheel supporting means.

2. In a vehicle having a frame, a wheel, and wheel supporting means pivotally connected to said frame, the combination of shock absorbing means comprising a plurality of disks frictionally held together by interpolated spring members connected respectively to said frame and said wheel supporting means.

3. In a springing arrangement for vehicles having a frame, in combination, a ground engaging member, a torsion spring member fixed at one end against rotation relative to the frame and journaled in said frame near its other end, means fixed to said torsion spring member for connecting said ground engaging member to said torsion spring member, and interlocked shock absorbing means joining said connecting means to said frame and holding said connecting means in place in the event of breakage of said torsion spring member.

4. In a springing arrangement for vehicles having a frame, in combination, a ground engaging member, a torsion spring member fixed at one end against rotation relative to the frame and journaled in said frame near its other end, means fixed to said torsion spring member for connecting said ground engaging member to said torsion spring member, and shock absorbing means joining said connecting means to said frame and holding said connecting means in place in the event of breakage of said torsion spring member, said shock absorbing means including interpersed spring members connected to said frame and said connecting means.

5. In a springing arrangement for vehicles having a frame, in combination, a ground engaging member, a torsion spring member fixed at one end against rotation relative to the frame and journaled in said frame near its other end, means fixed to said torsion spring member for connecting said ground engaging member to said torsion spring member, and shock absorbing means joining said connecting means to said frame and holding said connecting means in place in the event of breakage of said torsion spring member, said shock absorbing means comprising a plurality of disks frictionally held together by interspersed spring members connected to said frame and said connecting means.

KARL RABE.